United States Patent
King et al.

(10) Patent No.: US 9,960,461 B2
(45) Date of Patent: May 1, 2018

(54) SYSTEM AND METHOD FOR TEMPERATURE CONTROL OF MULTI-BATTERY SYSTEMS

(75) Inventors: Robert Dean King, Schenectady, NY (US); Lorne Wyatt Hofstetter, Latham, NY (US)

(73) Assignee: GENERAL ELECTRIC COMPANY, Schenetady, NY (US)

( * ) Notice: Subject to any disclaimer, the term of this patent is extended or adjusted under 35 U.S.C. 154(b) by 3060 days.

(21) Appl. No.: 12/251,665

(22) Filed: Oct. 15, 2008

(65) Prior Publication Data

US 2010/0089547 A1  Apr. 15, 2010

(51) Int. Cl.
  *H01M 10/617* (2014.01)
  *H01M 10/625* (2014.01)
  (Continued)

(52) U.S. Cl.
  CPC ......... *H01M 10/486* (2013.01); *B60L 3/0046* (2013.01); *B60L 3/0053* (2013.01);
  (Continued)

(58) Field of Classification Search
  CPC ............. H01M 10/617; H01M 10/625; H01M 10/613; H01M 10/486; H01M 10/615;
  (Continued)

(56) References Cited

U.S. PATENT DOCUMENTS

| | | | |
|---|---|---|---|
| 4,066,936 A | * | 1/1978 | Hirota ................. B60L 11/1853 318/139 |
| 6,288,881 B1 | * | 9/2001 | Melvin ................. H02J 7/1461 361/104 |

(Continued)

FOREIGN PATENT DOCUMENTS

WO  WO 2008/109764  * 9/2008 ............. H01M 2/10

OTHER PUBLICATIONS

MIT, "A Guide to Understanding Battery Specifications", MIT Electric Vehicle Team, Dec. 2008.

(Continued)

*Primary Examiner* — Maria J Laios
*Assistant Examiner* — Angela Martin
(74) *Attorney, Agent, or Firm* — Meagher Emanuel Laks Goldberg & Liao, LLP.

(57) ABSTRACT

An system includes a first battery having a first desired operating temperature range between a first lower threshold temperature and a first upper threshold temperature and a second battery having a second desired operating temperature range between a second lower threshold temperature and a second upper threshold temperature. The system further includes a temperature control system coupled to the first and second batteries and configured to convey heat energy from the first battery to the second battery when the temperature of the second battery is less than the second lower threshold temperature to increase the temperature of the second battery toward the second desired operating temperature range and to convey heat energy away from the second battery when the temperature of the second battery is greater than the second upper threshold temperature to decrease the temperature of the second battery toward the second desired operating temperature range.

18 Claims, 4 Drawing Sheets

(51) Int. Cl.

| | | |
|---|---|---|
| *H01M 10/613* | (2014.01) | |
| *H01M 10/615* | (2014.01) | |
| *H01M 10/633* | (2014.01) | |
| *H01M 10/663* | (2014.01) | |
| *H01M 10/6563* | (2014.01) | |
| *H01M 10/6571* | (2014.01) | |
| *H01M 10/48* | (2006.01) | |
| *B60L 3/00* | (2006.01) | |
| *B60L 11/18* | (2006.01) | |

(52) U.S. Cl.
CPC ....... *B60L 11/1855* (2013.01); *B60L 11/1875* (2013.01); *H01M 10/613* (2015.04); *H01M 10/615* (2015.04); *H01M 10/625* (2015.04); *H01M 10/633* (2015.04); *H01M 10/6563* (2015.04); *H01M 10/6571* (2015.04); *H01M 10/663* (2015.04); *Y02T 10/705* (2013.01); *Y02T 10/7011* (2013.01); *Y02T 90/34* (2013.01)

(58) Field of Classification Search
CPC ............. H01M 10/633; H01M 10/663; H01M 10/6563; H01M 10/6571; B60L 11/187
USPC ............................................ 429/62, 120, 61
See application file for complete search history.

(56) References Cited

U.S. PATENT DOCUMENTS

| | | | |
|---|---|---|---|
| 6,321,707 B1 * | 11/2001 | Dunn ................. | F02N 11/0866 123/179.3 |
| 6,392,387 B1 * | 5/2002 | Sage ..................... | H02J 7/0031 320/136 |
| 7,049,792 B2 | 5/2006 | King | |
| 9,056,556 B1 * | 6/2015 | Hyde .................. | B60L 11/1851 |
| 9,079,595 B2 * | 7/2015 | Chen ...................... | B62B 3/005 |
| 2002/0101218 A1 * | 8/2002 | Koenck .............. | G01R 31/3655 320/140 |
| 2005/0284676 A1 * | 12/2005 | King ......................... | B60L 7/06 180/65.22 |
| 2007/0212596 A1 * | 9/2007 | Nebrigic ............... | H01M 10/44 429/61 |
| 2007/0219670 A1 * | 9/2007 | Tanaka ................ | H01M 10/482 700/295 |
| 2007/0231678 A1 * | 10/2007 | Park .................... | H01M 10/625 429/62 |
| 2008/0048608 A1 * | 2/2008 | Lim ..................... | H01M 10/441 320/106 |
| 2008/0176115 A1 * | 7/2008 | Yamamiya ........ | H01M 8/04014 429/421 |
| 2008/0281479 A1 * | 11/2008 | King ..................... | B60L 11/123 701/22 |
| 2008/0292948 A1 * | 11/2008 | Kumar et al. ................. | 429/120 |
| 2009/0139781 A1 * | 6/2009 | Straubel ............. | B60L 11/1875 180/65.1 |

OTHER PUBLICATIONS

S.K. Biradar et al., "Energy Storage System in Electric Vehicle", IEEE, Power Quality '98, pp. 247-255, Jun. 18, 1998.

Munshi, M. A., et al., "Assessment of Thin Film Batteries Based on Polymer Electrolytes: III. Specific Energy versus Specific Power", Minnesota Univ Minneapolis Dept of Chemical Engineering and Materials Science, 1989.

* cited by examiner

SYSTEM AND METHOD FOR TEMPERATURE CONTROL OF MULTI-BATTERY SYSTEMS

BACKGROUND

The invention relates generally to multi-battery systems and, more particularly, to a temperature control system for multiple batteries.

A wide variety of devices, apparatuses, or systems use multiple batteries to power various aspects and/or components thereof. Often, such batteries operate optimally within a defined temperature range. That is, batteries of such devices operate optimally when the temperatures of such batteries are kept within a determined or defined temperature operating range. Further, two or more batteries of such devices may have preferred temperature operating ranges that differ from one another. To maintain operating temperatures of batteries, energy is often consumed for heating and cooling purposes.

Multi-battery systems in vehicles such as a battery electric vehicle (BEV), a hybrid-electric vehicle (HEV), or a plug-in hybrid electric vehicle (PHEV) generally include an energy storage system capable of operation over a wide range of environmental temperatures due to variation in ambient temperature. Further, "under-the-hood" systems of such vehicles, such as an internal combustion engine (ICE) and/or other adjacent propulsion and auxiliary components, often cause further temperature variations. Consumers, however, often expect the performance of an electric or hybrid electric propelled vehicle to remain relatively constant irrespective of temperature of the energy storage unit and propulsion drive system.

Many vehicles such as the BEV, HEV, and the PHEV typically use energy storage systems that are capable of producing rated power over a rather narrow environmental temperature range. Depending on the energy storage technology (e.g., lead-acid, Ni-MH, and Li-Ion), output power during discharge is often de-rated or limited when storage temperatures fall to or below approximately zero degrees Celsius, and for some technologies, the battery is not utilized below approximately negative twenty degrees Celsius. Similarly, the power level allowed to recharge the batteries, either by the utility grid to a BEV or PHEV or by regenerative braking, is also often limited at low ambient temperatures. Further, many multi-battery systems rely on batteries have differing optimal operating temperature ranges. For example, a hybrid-electric propulsion system may rely on a high-temperature battery that optimally operates in a temperature range from 270-350 degrees Celsius while also relying on an ambient temperature battery that optimally operates in a temperature range from 0-35 degrees Celsius.

To address operating temperatures of batteries in multi-battery systems, systems have been created that rely on a combination of resistive heaters coupled to each battery in such multi-battery systems and utilization of battery containment boxes that provide thermal insulation. The resistive heaters are then used to ensure that the batteries of such systems are kept within their optimal operating temperature ranges. Such heaters, however, consume electrical power. As such, often an additional battery is added to such systems to power the heaters. However, the additional weight that comes with the additional battery often diminishes vehicle and/or battery performance and often results in inefficiencies. Another solution has been to oversize the traction batteries of systems, such as in an HEV, to provide sufficient power for operation at low ambient temperatures when the battery is forced to operate at temperatures below its optimal operating temperature range. Since the traction battery is oversized, it is able to produce rated power during discharge and also to accept charge power during regenerative braking operation or engine charging in a hybrid vehicle. However, as with the additional battery scenario described above, the added weight of the oversized battery can cause diminished performance and other inefficiencies of such systems.

As such, it may be desirable to have a system that has aspects and features that differ from those that are currently available and that solves at least the aforementioned problems. Further, it may be desirable to have a method that differs from those methods that are currently available.

BRIEF DESCRIPTION OF THE INVENTION

Aspects of the invention provide a system including a first battery having a first desired operating temperature range between a first lower threshold temperature and a first upper threshold temperature and a second battery having a second desired operating temperature range between a second lower threshold temperature and a second upper threshold temperature. The second upper threshold temperature is less than the first lower threshold temperature. The system further includes a temperature control system coupled to the first and second batteries and configured to convey heat energy from the first battery to the second battery when the temperature of the second battery is less than the second lower threshold temperature to increase the temperature of the second battery toward the second desired operating temperature range and to convey heat energy away from the second battery when the temperature of the second battery is greater than the second upper threshold temperature to decrease the temperature of the second battery toward the second desired operating temperature range.

Aspects of the invention also provide an apparatus that includes a heat exchange system having a heat transfer path, and a controller. The controller is configured to transfer heat energy from a first battery to a second battery along a first portion of the heat transfer path when a temperature of the second battery is operating at a first temperature such that an operating temperature of the second battery increases. The controller is also configured to transfer heat energy away from the second battery along a second portion of the heat transfer path when the second battery is operating at a second temperature such that the operating temperature of the second battery decreases.

Aspects of the invention also provide a method that includes transmitting heat energy away from a first battery when a temperature of the first battery is above a first threshold temperature and transmitting heat energy away from a second battery to the first battery when a temperature of the first battery is below a second threshold temperature.

Various other features may be apparent from the following detailed description and the drawings.

BRIEF DESCRIPTION OF THE DRAWINGS

The drawings illustrate at least one preferred embodiment presently contemplated for carrying out the invention.

In the drawings.

DETAILED DESCRIPTION

The invention includes embodiments that relate to battery temperature control systems for systems and apparatuses that use multiple batteries. Embodiments of the invention may be implemented in a wide variety of systems that rely on multiple batteries. For example, embodiments of the inventions may be implemented in vehicles such as hybrid-electric vehicles, locomotives, generators, and other systems that use more than one battery.

Figure 1:
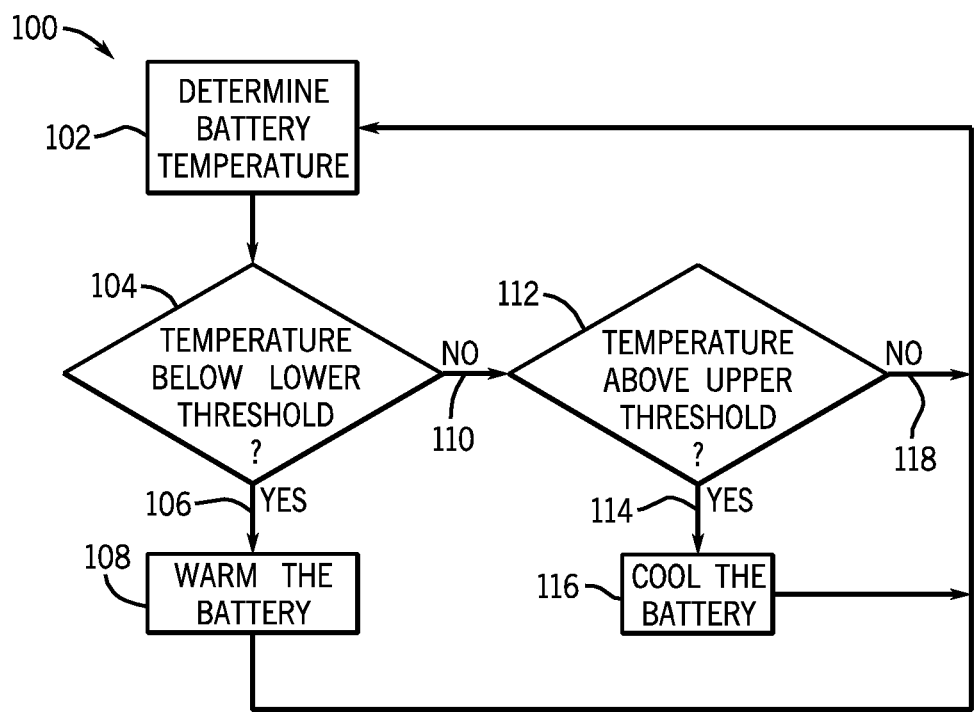
FIG. 1 is a flowchart depicting an operational overview of a multi-battery temperature regulating system according to an embodiment of the invention.

Referring to FIG. 1, a flowchart depicting an operational overview of battery temperature maintenance in a multiple battery temperature control system according to an embodiment is shown. Often, batteries of a system operate optimally if the temperatures of such batteries are within a particular temperature range. In addition, the particular optimal temperature ranges may be different for differing batteries being used in the system. Technique 100 begins at BLOCK 102, where the temperature of a battery is determined. At decision BLOCK 104, the temperature of the battery is compared with a lower threshold to determine whether the temperature is below the lower threshold. The lower threshold represents a battery temperature below an optimal operating range of the battery. As mentioned, batteries often operate optimally within a temperature range, which may be defined by a lower threshold and an upper threshold. If the temperature of the battery is below the lower threshold 106, process control proceeds to BLOCK 108, where heat energy is conveyed or transferred to the battery to warm the battery to a temperature toward or above the lower threshold of the battery. Warming the battery may include setting a damper to one position and turning a fan on to convey heat energy to the battery. Embodiments of the invention include transferring heat energy from another battery having a higher operating temperature than the battery being warmed as will be described in greater detail below with respect to FIG. 2. After the battery is warmed or warming toward the lower threshold 108, process control returns to BLOCK 102, and technique 100 is repeated in order to put or maintain the temperature of the battery within its optimal temperature range.

If, on the other hand, it is determined at decision BLOCK 104 that the temperature of the battery is not below the lower threshold 110, process control proceeds to decision BLOCK 112, where the temperature of the battery is compared with the upper threshold to determine whether the battery is above the upper threshold. The upper threshold of the battery identifies a threshold above which the battery may be operating too hotly. If the battery is above the upper threshold 114, process control proceeds to BLOCK 116, where the battery is cooled by conveying heat energy away from the battery. Embodiments of the invention include conveying cooling air from either an operator cabin or ambient air to the battery via a fan, for example, so that the battery is cooled, such as will be described in greater detail below with respect to FIG. 2. After the battery is cooled or cooling toward the upper threshold 116, process control returns to BLOCK 102, and technique 100 is repeated in order to put or maintain the temperature of the battery within its optimal temperature range. If it is determined at decision BLOCK 112 that the temperature of the battery is not above the upper threshold 118 (i.e., the battery is within the optimal temperature range since it is not below the lower threshold or above the upper threshold), process control returns to BLOCK 102, and technique 100 is repeated in order to put or maintain the temperature of the battery within its optimal temperature range.

Technique 100 may be applied to all batteries in the multi-battery system. According to an embodiment of the invention, technique 100 is asynchronously applied to each respective battery. That is, the temperature of one battery may be determined and maintained independently from another battery. Accordingly, technique 100 depicts an operational overview of a multiple battery temperature control system according to an embodiment of the invention.

Figure 2:
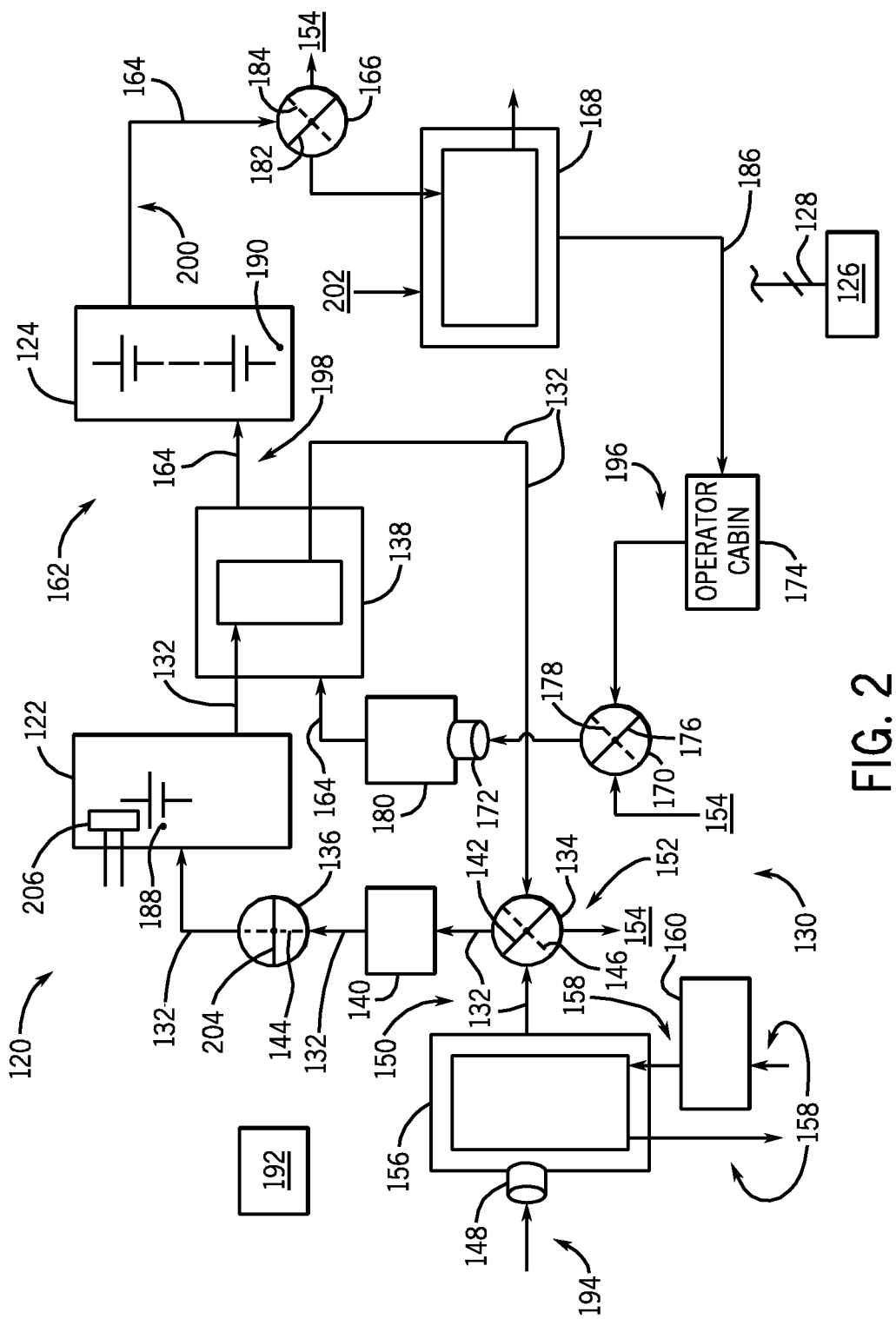
FIG. 2 is a schematic diagram of a multi-battery temperature control system according to an embodiment of invention.

Referring to FIG. 2, a schematic diagram of a multi-battery temperature control system 120 is depicted according to an embodiment of invention. As depicted, multi-battery temperature control system 120 is coupled to a first battery 122 and to a second battery 124. In the present embodiment, first battery 122 is a high-specific energy, high-temperature battery such as, for example, a Sodium Metal Halide battery, a Sodium Sulphur battery, or a Sodium-Nickel Chloride battery. Further, second battery 124, in the present embodiment, is a high-specific power battery that optimally operates at room or ambient temperature. For example, second battery 124 may be a Lithium Ion battery, a Lithium Polymer battery, a Nickel-Metal Hydride battery, a Nickel-Cadmin battery, or a Lead-Acid battery. Embodiments of the invention include controlling a temperature of each battery 122, 124 such that they operate in their respective optimal temperature ranges. Temperature control system 120 includes a controller 126, which manipulates temperature control system 120 via signals transmitted across a bus or a series of signal lines 128 to various components of temperature control system 120 as will be discussed below. Though only one controller 126 is shown, it is contemplated that temperature control system 120 could be regulated by multiple controllers.

Included in temperature control system 120 is a temperature regulating circuit 130 having a plurality of passageways 132 thermally coupled to first battery 122. Temperature regulating circuit 132 includes a first damper 134, a second damper 136, and a portion of a first heat exchanger 138. A first fan 140 conveys air through temperature regulating circuit 130. First damper 134, when placed in a first position 142, creates a closed loop circuit. Accordingly, when first fan 140 is on and second damper 136 is placed in an open position 144, air circulating through temperature regulating circuit 130 is re-circulated back to first fan 140 after passing near or through first battery 122. If, on the other hand, first damper 134 is placed in a second position 146 while second damper 136 is in open position 144, an open-loop circuit is created in temperature regulating circuit 130. In such an instance, air circulating through temperature regulating circuit 130 is not re-circulated back to first fan 140. Temperature regulating circuit 130 includes an air intake 148 and an intake passageway 150 to allow for air entry into temperature regulating circuit 130. An air exit passageway 152 allows air to exit the open loop temperature regulating circuit 130 and into the atmosphere 154. A second heat exchanger 156 is coupled to intake 148 and to a coolant source 158. A coolant pump 160 circulates coolant through second heat exchanger 156 to exchange heat energy between the coolant and the intake air.

In addition to temperature regulating circuit 130 described above, temperature control system 120 also includes a temperature regulating circuit 162 having a plurality of passageways 164 thermally coupled to second battery 124. Temperature regulating circuit 162 includes a portion of first heat exchanger 138, a third damper 166, a third heat exchanger 168, and a fourth damper 170. Temperature regulating circuit 162 also includes an air intake 172 to allow for air entry into temperature regulating circuit 162 from either an operator cabin 174 when fourth damper 170 is in a first position 176 or from the atmosphere 154 when fourth damper 170 is in a second position 178. A second fan 180 conveys air through temperature regulating circuit 162. Third damper 166, when placed in a first position 182, allows air passing through temperature regulating circuit 162 to exit to the atmosphere 154. However, when placed in a second position 184, third damper 166 allows air to pass through third heat exchanger 168. Heat energy passed into third heat exchanger 168 can then be conveyed through passageway 186 into operator cabin 174.

As previously discussed, controller 126, or multiple controllers, controls temperature control system 120 and components thereof to keep first battery 122 and second battery 124 within respective operating temperatures. Temperature control system 120 includes a first temperature sensor 188 coupled to the first battery 122 and a second temperature sensor 190 coupled to the second battery 124 for determining the temperatures of the respective batteries 122, 124. In addition, an ambient air sensor 192 is included for determining ambient air temperature.

When, for example, it is determined via second temperature sensor 190 that second battery 124 is below a first threshold operating temperature (i.e., below the lower threshold temperature) and via ambient air sensor 192 that the ambient air 194 is at or below a "cut-off" temperature of, for example, zero degrees Celsius, controller 126 causes first damper 134 to move to first position 142, activates first fan 140, activates second fan 180, and causes second damper 136 to move to open position 144. As such, fan one 140 circulates air warmed by first battery 122 through temperature regulating circuit 130, that in the present instance comprises a closed loop path. Along the closed loop path, the air warmed by first battery 122 passes through a portion of first heat exchanger 138, which in the present embodiment is an air/air heat exchanger. Concurrently, as the warmed air passes through a portion of first heat exchanger 138, activated second fan 180 passes air through temperature regulating circuit 162 from either a cabin cooling air stream 196 from operator cabin 174 when fourth damper 170 is in first position 176, or ambient air 154 when fourth damper 170 is place in second position 178. As such, either cabin cooling air 196 or ambient air 154 is passed through a portion of first heat exchanger 138. Accordingly, heat energy passed from first battery 122 into temperature regulating circuit 130 is transferred or conveyed, via first heat exchanger 138, into temperature regulating circuit 162. That is, heat energy is transferred from the air traveling through temperature regulating circuit 130 into cabin cooling air 196 or ambient air 154 passing through first heat exchanger 138. Therefore, heated air 198 is output through or near second battery 124 from first heat exchanger 138. Consequently, the heat energy being carried by heated air 198 of temperature regulating circuit 162 is transferred into second battery 124, thus warming second battery 124. Battery two output air 200 may either exit into the atmosphere 154 if third damper 166 is in first position 182, or enter into third heat exchanger 168 if third damper 166 is in second position 184.

When third damper 166 is in second position 184, when fourth damper 170 is in first position 176, and when second fan 180 is activated, heat is transferred from second battery 124 into operator cabin 174. That is, via third heat exchanger 168, heat is transferred to cabin inlet air 202 that travels to operator cabin 174, thereby allowing a rapid increase in operator cabin temperature to benefit cabin operator or passengers as well as facilitate defrost of windshield when appropriate vehicle control settings (not shown) are selected. Cabin inlet air 202 can be either ambient air or re-circulated air from operator cabin 174, depending on operator selection.

The above-described heat transfer from temperature regulating circuit 130 to temperature regulating circuit 162 also serves to cool first battery 122. That is, since temperature regulating circuit 130 is transferring heat energy away from first battery 122, and heat energy is not being added to temperature regulating circuit 130, first battery 122 cools.

As set forth in the present embodiment, heat energy is conveyed from first battery 122 to second battery 124 via first heat exchanger 138. To warm second battery 124 as just described, heat energy in temperature control system 120, in part, follows a heat path from first battery 122 to second battery 124 that is coincident with a portion of temperature regulating circuit 130 and temperature regulating circuit 162. As such, though the air streams of each temperature regulating circuit 130, 162 are distinct from one another, portions of each temperature regulating circuit 130, 162 share a common heat path.

In the present embodiment, once controller 126 determines via second temperature sensor 190 that the temperature of second battery 124 is within the predetermined range (i.e., optimal operating temperature range of second battery 124), second fan 180 is deactivated such that air circulation through temperature regulating circuit 162 ceases. Further, first fan 140 may also be deactivated and second damper 136 may be placed in a closed position 204. It is contemplated that either controller 126 has stored therein, or stored in memory coupled thereto, the set values to determine whether the temperature output from second sensor 190 is within the optimal temperature range of second battery 124. As such, controller 126 can compare the set values to the temperature determined second sensor 190 to determine whether second battery 124 is at, below, or above the set values.

If, on the other hand, controller 126 determines via second sensor 190 that the temperature of second battery 124 is above a second threshold (i.e., above the upper limit of the optimal temperature operating range of second battery 124), controller 126 activates second fan 180, causes second damper 136 to be placed in closed position 204 (or ensures that damper two 136 is in closed position), and causes or ensures that third damper 166 is in second position 184. As such, high-temperature cooling air is not circulated through temperature regulating circuit 130. Rather, only, or substantially only, cabin cooling air 196 or ambient air 154, depending on position of fourth damper 170, passes through temperature regulating circuit 162. Since cabin cooling air 196 or the ambient air 154 is not warmed via second heat exchanger 156, the air passed through or near second battery 124 is cooler than second battery 124. As such, heat energy is conveyed away from second battery 124 into second battery output air 200; thus, second battery 124 is cooled.

In addition to regulating or controlling the temperature of second battery 124, the temperature of first battery 122 may also be regulated according to embodiments of the invention. As already described above, if temperature regulating circuit 130 is a closed path with first damper 134 in first position 142 and second damper 136 in open position 144, temperature regulating circuit 130 can be used to cool first battery 122 and warm second battery 124. However, further first battery 122 temperature regulation is also contemplated. For example, in one embodiment, controller 126 may determine from the output of first temperature sensor 188 that first battery 122 is at a temperature above its optimal operating temperature range. That is, controller 126 may determine that the temperature of first battery 122 is above the upper threshold of its optimal temperature range. In such an instance, controller 126 may cause temperature system 120 to cool first battery 122. As such, in an alternate embodiment, controller 126 may cause first damper 134 to be placed in second position 146, first fan 140 to be activated, and second damper 136 to be placed in open position 144. As such, temperature regulating circuit 130 extends through second heat exchanger 156, first damper 134, first fan 140, second damper 136, first battery 122, first heat exchanger 138, and back through first damper 134 to outside atmosphere 154. As such, ambient air 194 is drawn into second heat exchanger 156 and output to intake passageway 150, where it then proceeds through the remainder of temperature regulating circuit 130 before it exits at air exit passageway 152. It is contemplated that second heat exchanger 156 is an air-liquid heat exchanger, such as a radiator, having coolant 158 therein and pumped therethrough when coolant pump 160 is activated. Accordingly, heat energy is transferred from coolant 158 to ambient air 194 passing through second heat exchanger 156 such that air output from second heat exchanger 156 to intake passageway 150 is a high-temperature coolant air. It is envisioned that the temperature of ambient air 194 air output (i.e., high temperature coolant air) to intake passageway 150 will be less than the temperature of first battery 122. As such, heat energy from first battery 122 will be transferred to the high-temperature cooling air; thus cooling battery one 122. After passing through first heat exchanger 138, the high-temperature coolant air is directed to atmosphere 154 via damper one 134.

At least two modes of operation are contemplated for cooling first battery 122 via coolant 158. In a first mode, it is contemplated that coolant pump 160 would be enabled such that second heat exchanger 156 would have a flow of high-temperature coolant 158 passed therethrough. In a second mode, it is contemplated that coolant pump 160 would be disabled such that "fresh" high-temperature coolant 158 would not be passed through second heat exchanger 156. As such, the second mode would cool first battery 122 at a faster rate than the first mode.

Not only may the temperature of first battery 122 be lowered, the temperature of first battery 122 may be raised according to embodiments of the invention. For example, if controller 126 determines, via first temperature sensor 188, that first battery 122 is below the lower threshold of the optimal operating temperature range, a heater 206 coupled to first battery 122 may be activated. In such an instance, heater 206 will remain activated until the temperature of first battery 122 is within its predetermined optimal operating range. Heater 206 coupled to first battery 122 may be powered in a variety ways, as will de described more fully below with respect to FIG. 3.

Figure 3:
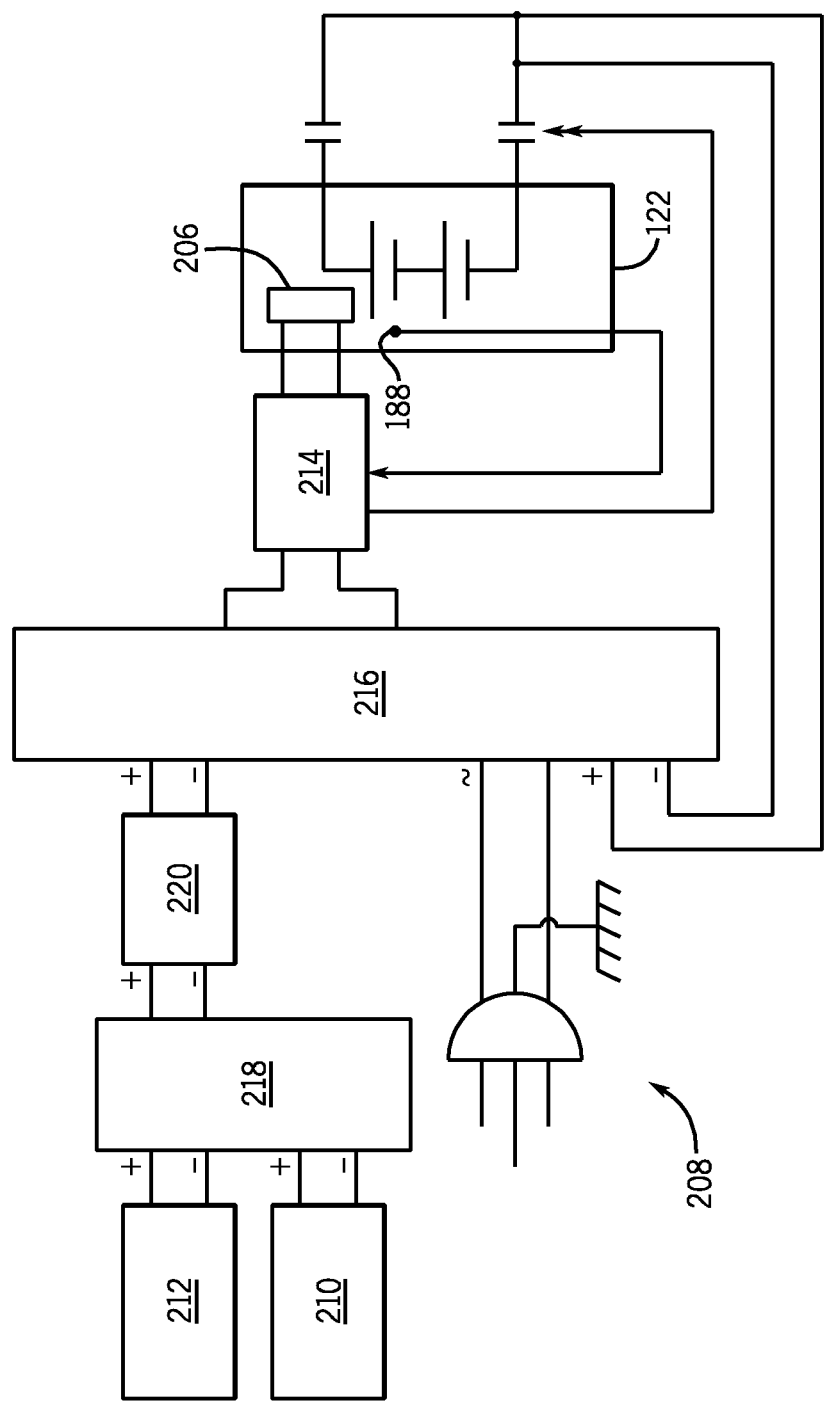
FIG. 3 is a schematic diagram depicting exemplary embodiments for powering the heater of battery one in FIG. 2.

Referring to FIG. 3, a schematic diagram depicting several exemplary embodiments for powering heater 206 of first battery 122 are shown. As shown, heater 206 of first battery 122 may be powered by first battery 122 itself, a utility grid 208, a starting lighting and ignition (SLI) battery 210, or a photovoltaic (PV) array 212. In the present embodiment, a temperature switch/controller 214, a first transfer switch 216, and a second transfer switch 218 may be used to enable or disable the possible power sources 122, 208, 210, 212 of heater 206. For example, temperature switch/controller 214 such as a pulse width modulated (PWM) temperature controller may determine that the temperature output from first temperature sensor 188 is below the lower threshold temperature of the optimal operating temperature of first battery 122. As such, controller 214 may cause first transfer switch 216 to allow power from first battery 122 to power heater 206. On the other hand, temperature controller 214 may instead allow power from utility grid 208 to power heater 206. Alternatively, second transfer switch 218 may allow power from one of PV array 212 or SLI battery 210 to pass to first battery 122. In such an instance, power from PV array 212 or SLI battery 210 passes through a DC-DC converter 220 to prepare the power. Upon passing through DC-DC converter 220, the power will be passed to heater 206 if it is allowed to do so by first transfer switch 216. It is contemplated that each power source 122, 208, 210, 212 could independently, or in conjunction with one another, power heater 206. As such, in one embodiment, only one of the multiple power sources is used to power heater 206. In an alternate embodiment, multiple power sources may be concurrently used to power heater 206 of first battery 122. In addition, it is contemplated that alternate configurations having multiple heaters (not shown) may be implemented. Other power sources are also contemplated such as, for example, an on-board engine generator (not shown) or a fuel cell (not shown).

Figure 4:
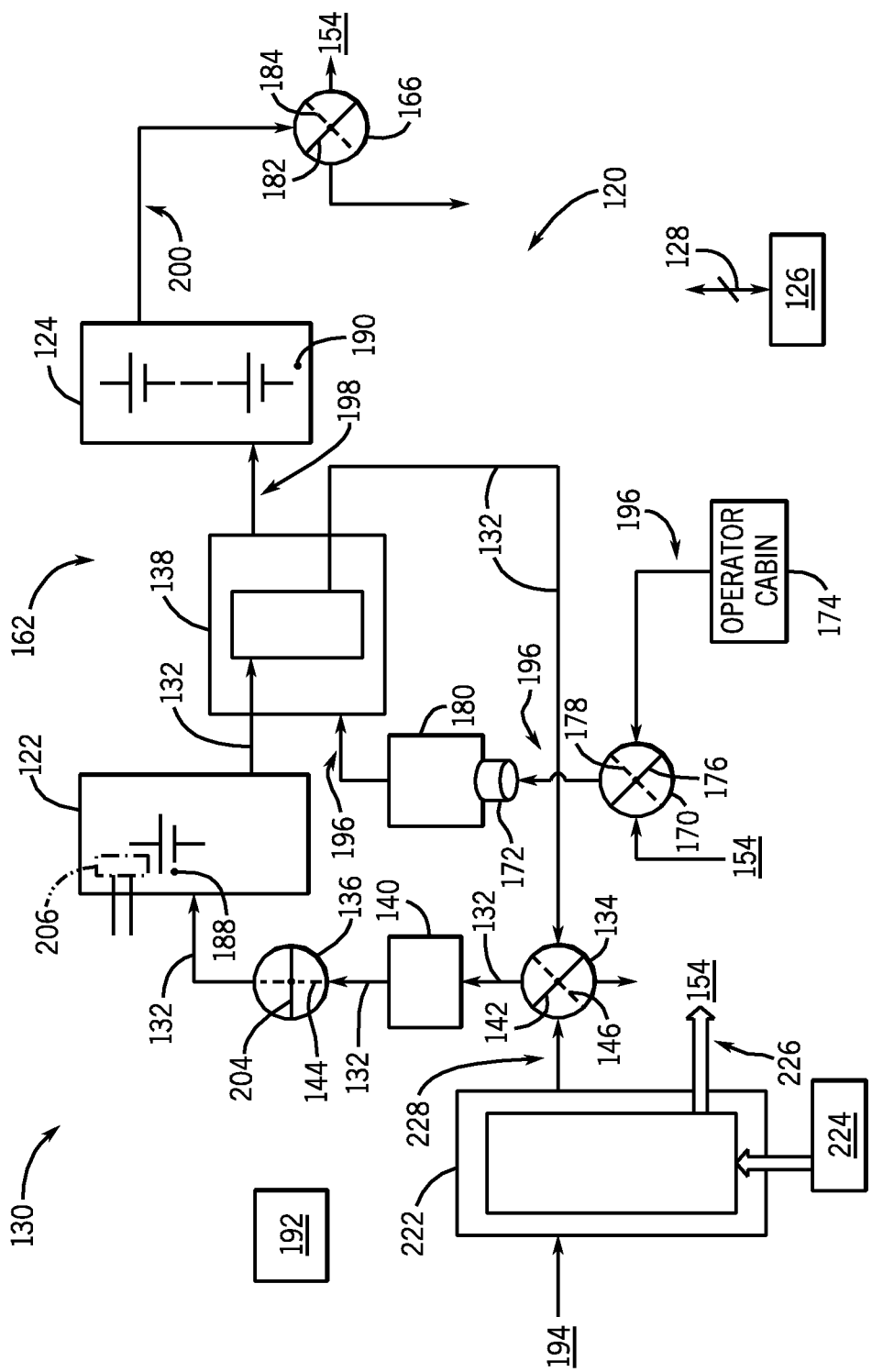
FIG. 4 is, according to an embodiment of the invention, a schematic diagram of a multi-battery temperature control system that uses waste energy as a heat source.

In addition to, or instead of, using heater 206 to warm first battery 122, it is contemplated that waste energy could be used to warm first battery 122. Further, such waste energy could also be used to warm second battery 124. For example, FIG. 4 is a schematic diagram of a battery temperature regulating system for a hybrid-electric vehicle that illustrates the use of waste energy as a heat source for first battery 122 and/or second battery 124 according to embodiments of the present invention. In the present embodiment an air/air heat exchanger 222 replaces second heat exchanger 156 (i.e., air/liquid heat exchanger) of FIG. 2. Further, 224 of FIG. 4 represent an engine, alternator, or other heat source, rather than coolant pump 160 of FIG. 2. As shown in FIG. 4, ambient air 194 can be drawn through air/air heat exchanger 222 by first fan 140 when first damper 134 is in second position 146 and second damper 136 is in open position 144. As such, heat is conveyed from engine 224 (i.e., waste energy) or an exhaust thereof to ambient air 194 that passes through air/air heat exchanger 222. Any excess waste energy 226 is allowed to pass to the atmosphere 154. Accordingly, high-temperature air is output 228 from air/air heat exchanger 222 into temperature regulating circuit 130. It is contemplated that the high-temperature air is at a temperature within or greater than the optimal operating temperature range of first battery 122. Therefore, as the high-temperature air passes through or near first battery 122, heat energy is conveyed from the high-temperature air to first battery 122. The flow of the high-temperature air will continue until it is determined from the output of first temperature sensor 188 that the temperature of first battery 122 is within the optimal operating temperature range of first battery 122. In such an embodiment, since heater 206 (shown in phantom) is not activated during driving or while engine is operating, the electrical load on either fuel driven engine/alternator 224, a fuel cell (not shown), or other power source (e.g., 122, 210, 212 of FIG. 3) is reduced. As such, fuel consumption is reduced and fuel economy is increased for a hybrid-electric vehicle that uses such a system. Further, since air/air heat exchanger 222 is being used to heat first battery 122, it is contemplated that first battery 122 need not have heater 206 coupled thereto for selected applications.

Not only can the waste energy be used to increase the temperature of first battery 122, it may also be used to increase the temperature of second battery 124. For example, controller 126 could cause first damper 134 to be set in second position 146, first fan 140 to be activated, second damper 136 to be placed in open position 144, and second fan 180 to be activated. Accordingly, high-temperature air output 228 to temperature regulating circuit 130 would flow through or near first battery 122 and first heat exchanger 138 before it is directed out to atmosphere 154 by first damper 134. Since second fan 180 is activated, heat energy from the high-temperature air passing through first heat exchanger 138 is conveyed or transferred to air passing through first heat exchanger 138 of temperature regulating circuit 162. Therefore, second battery 124 will be heated by heated air 198 output from first heat exchanger 138. In such an embodiment, heating will continue until it is determined via the output of either battery temperature sensor 190, 188 that either first battery 122 or second battery 124 is within its respective optimal operating temperature range. Though the present embodiment is directed to hybrid-electric vehicles, it is contemplated that temperature control system 120 could be utilized in systems or devices other than hybrid-electric vehicles. That is, it is contemplated that the system described above could be used for other multi-battery systems that create waste heat energy.

It is contemplated that a battery temperature regulating system may include a combination of the embodiments shown in FIGS. 2 and 4. For example, it is contemplated that a battery temperature regulating system may include air/liquid heat exchanger 156 shown in FIG. 2 and air/air heat exchanger 222 shown in FIG. 4. In such an embodiment, air/liquid heat exchanger 156 could be used to cool first battery 122 and heat second battery 124, while air/air heat exchanger 222 could be used for heating first battery one 122 and as an alternative for heating second battery 124.

A technical contribution for the disclosed method and apparatus is that it provides for a controller implemented temperature regulating system for a multi-battery system.

According to an embodiment of the invention, a system includes a first battery having a first desired operating temperature range between a first lower threshold temperature and a first upper threshold temperature and a second battery having a second desired operating temperature range between a second lower threshold temperature and a second upper threshold temperature. The second upper threshold temperature is less than the first lower threshold temperature. The system further includes a temperature control system coupled to the first and second batteries and configured to convey heat energy from the first battery to the second battery when the temperature of the second battery is less than the second lower threshold temperature to increase the temperature of the second battery toward the second desired operating temperature range and to convey heat energy away from the second battery when the temperature of the second battery is greater than the second upper threshold temperature to decrease the temperature of the second battery toward the second desired operating temperature range.

According to another embodiment, an apparatus includes a heat exchange system having a heat transfer path, and a controller. The controller is configured to transfer heat energy from a first battery to a second battery along a first portion of the heat transfer path when a temperature of the second battery is operating at a first temperature such that an operating temperature of the second battery increases. The controller is also configured to transfer heat energy away from the second battery along a second portion of the heat transfer path when the second battery is operating at a second temperature such that the operating temperature of the second battery decreases.

According to yet another embodiment, a method includes transmitting heat energy away from a first battery when a temperature of the first battery is above a first threshold temperature and transmitting heat energy away from a second battery to the first battery when a temperature of the first battery is below a second threshold temperature.

The invention has been described in terms of the preferred embodiment, and it is recognized that equivalents, alternatives, and modifications, aside from those expressly stated, are possible and within the scope of the appending claims.

What is claimed is:

1. A system comprising:
a high-specific energy battery having a first operating temperature range between a first lower threshold temperature and a first upper threshold temperature;
a high-specific power battery having a second operating temperature range between a second lower threshold temperature and a second upper threshold temperature, wherein the second upper threshold temperature of the high-specific power battery is less than the first lower threshold temperature of the high-specific energy battery; and
a temperature control system comprising a heat exchanger system, the heat exchanger system coupled to the high-specific energy and high-specific power batteries, wherein the temperature control system is programmed to:
convey heat energy from the high-specific energy battery to the high-specific power battery through the heat exchanger system when the temperature of the high-specific power battery is less than the second lower threshold temperature to increase the temperature of the high-specific power battery toward the second operating temperature range; and
convey heat energy away from the high-specific power battery through the heat exchanger system when the temperature of the high-specific power battery is greater than the second upper threshold temperature to decrease the temperature of the high-specific power battery toward the second operating temperature range.

2. The system of claim 1 further comprising an electric hybrid engine coupled to the temperature control system.

3. The system of claim 1 wherein the heat exchanger system comprises an air-liquid heat exchanger programmed to output cooling air to the high-specific energy battery and the high-specific power battery.

4. The system of claim 3 wherein the air-liquid heat exchanger is programmed to intake air from ambient air.

5. The system of claim 1 wherein the temperature control system further comprises a heat source, the heat source comprising one of a resistive heater, an exhaust system, an engine, a radiator, and an independent heating unit, and the temperature control system is further programmed to convey heat energy from the heat source to the high-specific energy battery when the high-specific energy battery is below the first lower threshold temperature.

6. The system of claim 1 wherein the temperature control system, in being programmed to convey heat energy from the high-specific energy battery to the high-specific power battery, is configured to:

transfer heat energy from the high-specific energy battery to a first stream;
transfer heat energy from the first stream to a second stream, the second stream comprising air supplied from one of a cabin and an outside ambient environment; and
transfer heat energy from the second stream to the high-specific power battery.

7. The system of claim 6 wherein the heat exchanger system comprises an air/air exchanger programmed to transfer the heat energy from the first stream to the second stream.

8. The system of claim 1 wherein the temperature control system is further programmed to increase a temperature of an operator cabin with the heat energy conveyed away from the high-specific power battery, wherein the operator cabin is a cabin where an operator controls a transportation device.

9. The system of claim 1 wherein the high-specific energy battery operates in a temperature range from about 270 to 350 degrees Celsius, and wherein the high-specific power battery operates in a temperature range from about 0 to 35 degrees Celsius.

10. The system of claim 1 wherein the high-specific energy battery is one of a Sodium Metal Halide battery, a Sodium Sulphur battery, a Sodium-Nickel Chloride battery, and wherein the high-specific power battery is one of a Lithium Ion battery, a Lithium Polymer battery, a Nickel-Metal Hydride battery, a Nickel-Cadmin battery, and a Lead-Acid battery.

11. An apparatus comprising:
a heat exchange system comprising a first heat exchanger positioned along a first portion of a heat transfer path and a second heat exchanger positioned along a second portion of the heat transfer path; and
a controller programmed to:
transfer heat energy from a high-specific energy battery to a high-specific power battery through the first heat exchanger along the first portion of the heat transfer path when a temperature of the high-specific power battery is operating at a first temperature such that an operating temperature of the high-specific power battery increases; and
transfer heat energy away from the high-specific power battery through the second heat exchanger along the second portion of the heat transfer path when the high-specific power battery is operating at a second temperature such that the operating temperature of the high-specific power battery decreases.

12. The apparatus of claim 11 further comprising a hybrid-electric propulsion system comprising the high-specific energy and high-specific power batteries.

13. The apparatus of claim 11 wherein the controller is further programmed to:
cause the heat energy from the high-specific energy battery to pass through the first heat exchanger;
cause heat transfer air to pass through the first heat exchanger such that a portion of the heat energy from the high-specific energy battery is transmitted into an operator cabin air; and
cause the operator cabin air to transfer a portion of the heat energy to the high-specific power battery.

14. The apparatus of claim 11 wherein the heat exchange system further comprises:
a first temperature regulating circuit thermally coupled to the high-specific energy battery and programmed to increase and decrease the operating temperature of the high-specific energy battery; and
a second temperature regulating circuit thermally coupled to the high-specific power battery and programmed to increase and decrease the operating temperature of the high-specific power battery.

15. The apparatus of claim 14 wherein the heat exchange system further comprises:
a first fan programmed to convey air to heat the high-specific energy battery and to convey air to cool the high-specific energy battery through the first temperature regulating circuit; and
a second fan programmed to convey air to heat the high-specific power battery and to convey air to cool the high-specific power battery through the second temperature regulating circuit.

16. The apparatus of claim 11 wherein the heat exchange system further comprises a heat source, the heat source comprising one of an engine exhaust system, an engine, an alternator, and a radiator, and the controller is further programmed to transfer heat energy from a heat source to the high-specific energy battery.

17. The apparatus of claim 11 wherein the high-specific energy battery operates in a temperature range from about 270 to 350 degrees Celsius, and wherein the high-specific power battery operates in a temperature range from about 0 to 35 degrees Celsius.

18. The apparatus of claim 11 wherein the high-specific energy battery is one of a Sodium Metal Halide battery, a Sodium Sulphur battery, a Sodium-Nickel Chloride battery, and wherein the high-specific power battery is one of a Lithium Ion battery, a Lithium Polymer battery, a Nickel-Metal Hydride battery, a Nickel-Cadmin battery, and a Lead-Acid battery.

* * * * *